(12) United States Patent
Heim (10) Patent No.: US 8,301,859 B2
(45) Date of Patent: Oct. 30, 2012

(54) AUTOMATICALLY ADJUSTING MEMORY OF A VM ON A POWER CLIENT

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 409 days.

(21) Appl. No.: 12/489,262

(22) Filed: Jun. 22, 2009

(65) Prior Publication Data

US 2010/0325381 A1    Dec. 23, 2010

(51) Int. Cl.
 G06F 12/00    (2006.01)
 G06F 12/02    (2006.01)
 G06F 15/16    (2006.01)

(52) U.S. Cl. ......... 711/170; 711/E12.001; 711/E12.002; 709/203; 718/1

(58) Field of Classification Search .................... 711/170
 See application file for complete search history.

(56) References Cited

U.S. PATENT DOCUMENTS

2005/0262505 A1* 11/2005 Esfahany et al. ................ 718/1

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Yong Choe
(74) *Attorney, Agent, or Firm* — Lowenstein Sandler PC (57) ABSTRACT

Techniques for launching a VM with memory automatically adjusted based on a memory configuration of a client hosting the VM are described herein. According to one embodiment, a control server dynamically determines an amount of memory in view of a memory configuration of a client at the point in time, in response to a request for launching a VM for the client over a network. The amount of memory is allocated to be associated with the VM. Thereafter, the control server launches the VM for the client having the determined amount of memory allocated to the VM, where the VM is to be hosted by the client. Other methods and apparatuses are also described.

20 Claims, 5 Drawing Sheets

AUTOMATICALLY ADJUSTING MEMORY OF A VM ON A POWER CLIENT

TECHNICAL FIELD

Embodiments of the present invention relates generally to virtual machines. More particularly, embodiments relate to techniques for automatically adjusting memory for a virtual machine to be launched at a power client.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

The virtualization technologies have wide applications in the computer field with the development of computer systems. For example, such virtualization technologies can be used to implement a virtual desktop application which runs within a virtual machine and can be accessed from a client over a network, such as, for example, SolidICE™ available from Qumranet, Inc. of Israel, a subsidiary of Red Hat, Inc. of Raleigh, N.C.

Typically, when a VM is launched, a static or fixed amount of resources such as memory is allocated for the VM. If the target machine such as a power client (a client machine that has enough resource to host one or more VMs) has more processing resources, the VM is still launched with the same amount of resources. As a result, the processing resources of the power client are not fully utilized while the VM has an unnecessary limited amount of processing resources or bandwidth.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for launching a VM with memory automatically adjusted in view of a memory configuration of a client hosting the VM are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Typically, when launching a VM, a default amount of memory is allocated for the VM, where the default amount of memory is configured at the time of registration of the VM by an administrator. Note that a power client may be able to host one or more VMs. Some of the VMs may be hosted locally within the power client. Alternatively, a VM may be hosted by a remote node and accessed by the power client over a network. Thus, dependent upon the specification configuration of a client, at the time of launching a VM, the processing resources available at the client may vary from time to time. Throughout this application, a power client is defined as a computing node that has sufficient processing resources to host a VM locally within the client. For example, a power client may have certain hardware (e.g., microprocessor or CPU, memory) that is capable of supporting virtualization such as hosting a hypervisor and a VM. A regular client is referred to herein as those nodes that are typically configured to access a VM hosted remotely by another node over a network.

According to certain embodiments, when a VM is launched for a client (e.g., power client), an amount of processing resources such as memory to be associated with the VM is dynamically calculated in view of the client's operating environment at the point in time. That is, the default memory allocation of a VM is automatically adjusted. For example, when launching a VM, the amount of memory to be allocated for the VM is dynamically calculated based on the physical memory of the client or alternatively, it can be calculated based on the available memory at the point in time dependent upon certain conditions or configurations associated with the client.

In addition, the processing resources to be allocated for a VM may also be calculated based on previous resource usage or a history of configurations or operating conditions of the client. The history of client's behavior may be periodically monitored by a management or control system over a period of time.

This technique is useful when a VM is restarted or resumed. For example, when a VM is resumed and the client has more processing resources than it had prior to the shut down of the VM, more processing resources may be allocated to the VM being restarted or resumed. Similarly, prior to migrating a VM from a server node to a client, if the client has more processing resources than the ones allocated to the existing VM, more processing resources can be allocated to the new VM being migrated. Note that throughout this application, memory is utilized as an example of the processing resources. However, it is not so limited. Other types of processing resources, such as processing core logic or networking resources, etc. may also be applied. For example, if a single VM is scheduled to be hosted on a host having multiple core logic such as 4 cores available at the time, the VM can be launched with 3 to 4 virtual cores. However, if the host only has one core logic available at the time, the VM may be launched with a single virtual core.

Figure 1:
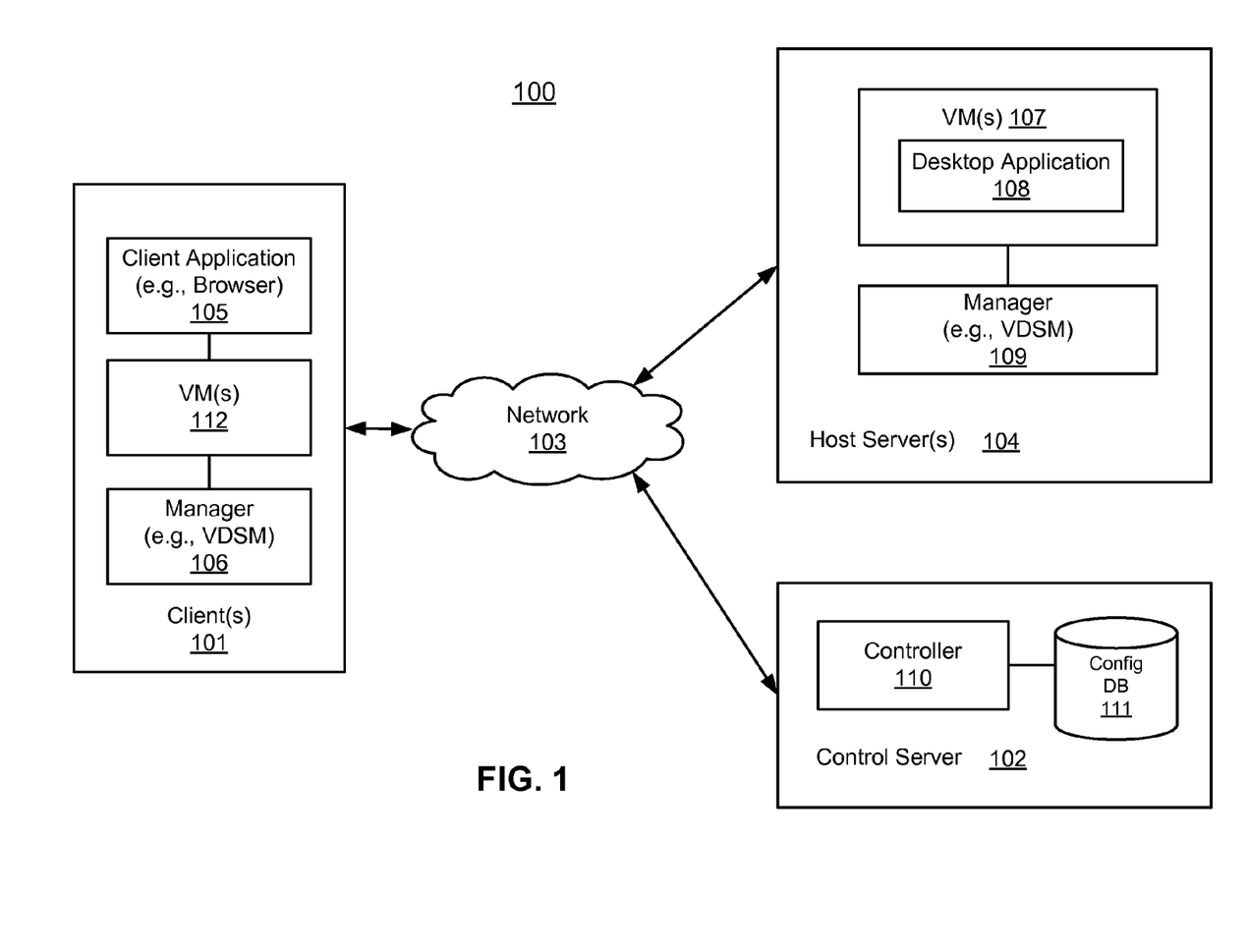
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent, not shown) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be managed by a control server 102 (also referred to as a management server or system). For example, in a graphics remoting application, host server 104 may be implemented as a VDS server while control server 102 may be implemented as a VDC (virtual desktop control) server.

According to one embodiment, when a request to launch a VM for a client such as client 101 is received, control server 102 dynamically determines an amount of memory to be associated with the VM being launched in view of the current operating conditions of client 101. The new VM may be launched as VM 112 at client 101 (e.g., CBC or client-based computing node), where client 101 is a power client that may have sufficient processing resources to host the new VM. Alternatively, the new VM may be launched as VM 107 at a server 104 (e.g., SBC or server-based computing node). For example, a VM may be launched at client 101 or server 104 after client 101 has started up. Alternatively, a VM may be launched at server 104 in parallel while client 101 is starting up in order to speed up the startup process of client 101. Subsequently, the VM launched at server 104 may be migrated back to client 101.

In one embodiment, when a request for launching a VM for client 101 is received by control server 102, controller 110 is configured to dynamically calculate an amount of memory for the VM based on processing resource configuration of client 101 at the point in time. The request may be received based on a signal transmitted by manager 106 of client 101. Alternatively, controller 110 may periodically poll client 101 in order to detect whether client 101 is starting up. Furthermore, the request may be received when a user of the client selects (e.g., via a Web portal) a VM to be launched.

The amount of memory calculated for the VM being launched may be based on the physical memory of client 101 or alternatively, based on the memory available in client 101 at the point in time dependent upon the specific configuration. In one embodiment, if the new VM is to be launched after client 101 has started, the amount of memory to be associated with the new VM may be calculated based on the available memory of client 101 at the point in time. For example, if client has already started up and/or may already have hosted at least one VM, the amount of memory calculated for an additional VM may be performed based on the available memory of client 101 at the point in time. It is more accurate to calculate the amount of memory for the VM based on the available memory of the client at the time. In one embodiment, the information of available memory of the client may be obtained dynamically from the client. For example, controller 110 of control server 102 may interrogate manager 106 of client 101 to obtain the runtime resource information of client 101, including the available memory of client 101.

When a client is starting, a VM may be concurrently launched in parallel in order to speed up the overall startup process of the client. For example, when client 101 is detected starting up, a VM associated with client 101 may be automatically launched at a remote node such as VM 107 of host server 104 in parallel. Thus, when client 101 is up and ready, so is the associated VM. The VM may be associated with a particular client and/or a user of the client during a registration of the client with control server 102. In this situation, according to one embodiment the amount of memory for the associated VM may be calculated based on the physical memory of the client. Since the startup process of the client in general tends to consume more memory than regular operations after the startup process, it would not be accurate to calculate the amount of memory to be associated with the VM based on the available memory during the startup of the client.

Note that in this example, although a VM is launched at a remote node such as VM 107 at server 104 in parallel with a startup process of client 101, the VM is eventually migrated back to client 101 as VM 112. Thus, client 101 is a target client in terms of a migration of a VM. Therefore, according to one embodiment, when calculating memory to be associated with VM 107, the calculation is performed view of the resource configuration of client 101 as a target client. This is useful because under certain circumstances such as Windows XP™ operating system, memory allocation may not be changed during a live migration.

The physical memory information of client 101 may be stored in configuration database 111 of control server 102 during a registration of client 101 at control server 102. Alternatively, control server 102 may obtain the same information dynamically via communications with client 101.

According to one embodiment, controller 110 starts with an allocated memory for a new VM based on either the available memory or physical memory of the client dependent upon a specific configuration of the client set forth above. Thereafter, the allocated memory for the new VM is further adjusted (e.g., deducted) based on general reserve, a history of resource usages of the client, and a number of VMs and/or a number of communications sessions per VM that the client could potentially be associated with, etc. Other resource conditions of the client may be also be considered.

Note that the techniques described throughout this application are not only applied to a power client, they can also be applied to other types of clients such as a CBC, desktop, or laptop client, etc. For example, if it is expect that a single VM to be launched within a client machine, one would like to utilize maximum processing resources available from the client.

Figure 2:
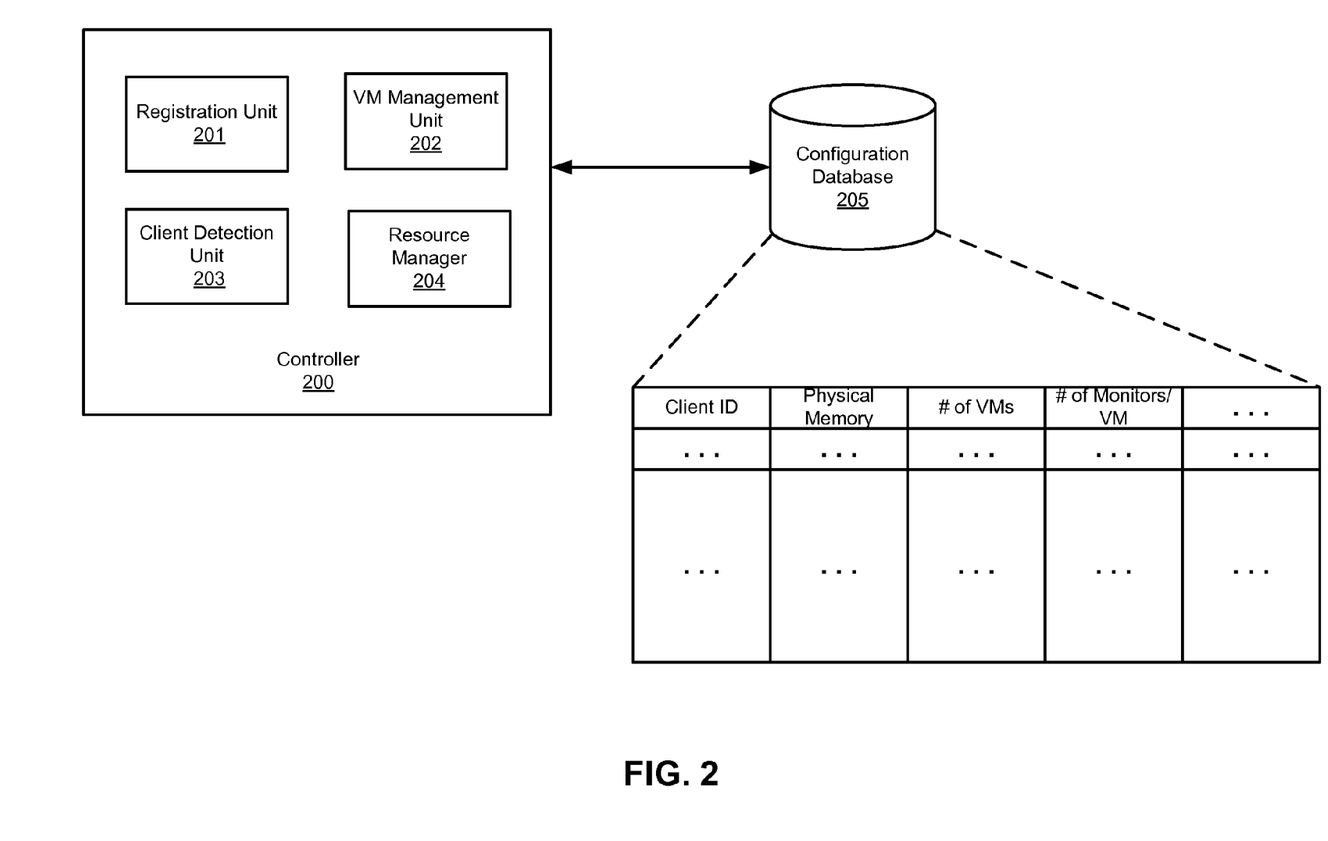
FIG. 2 is a block diagram illustrating an example of a control server according to one embodiment.

FIG. 2 is a block diagram illustrating an example of a control server according to one embodiment. For example, controller 200 may be implemented as part of controller 110 of FIG. 1 and configuration database 205 may be implemented as part of database 111 of FIG. 1. In one embodiment, controller 200 includes, but is not limited to, a registration unit 201, a management unit 202, a client detection unit 203, and a resource manager 204. When a client registers with a control server such as a VDC server, registration unit 201 is configured to associate a VM with the client and store such information in configuration database 205. In one embodiment, the information stored in configuration database 205 includes, but is not limited to, physical memory of a client, general reserved memory of the client, a number of VMs or a number of communications sessions potentially associated with the client, and a number of monitoring sessions potentially associated with each VM of the client. Note that some of all of these parameters may be obtained dynamically from the client at the point in time or during a registration of the client.

Subsequently, when a registered client starts up, client detection unit 203 is configured to detect such a startup process of the client using certain techniques described above. In one embodiment, a management or communications unit of the client may sends a message to client detection unit 203 indicating that the client is in a process of starting up. Alternatively, client detection unit 203 may periodically or constantly poll (e.g., ping) the client regarding the operating status of the client. Furthermore, such detection may be received when a user logs onto control server 102 and selects one or more VMs to be launched. In this example, the one or more VMs may be associated with the user instead of a client machine and the calculation may be performed based on a number of VMs to be selected and launched.

In response, resource manager 204 dynamically calculates an amount of memory to be allocated for the new VM when launching the new VM. In one embodiment, resource manager 204 calculates the allocated memory based on certain resource information of the client, dynamically obtained from the client at the point in time, from configuration database 205, or a combination of both.

In addition, resource manager 204 may calculate the allocated memory based on resource usage history of the client. In one embodiment, resource manager 204 includes a resource monitor that periodically or constantly monitors memory usages of the client. Such information may be collected and stored in configuration database 205 over a period of time.

Once the allocated memory for the new VM has been calculated, VM management unit 202 is configured to launch the new VM with the calculated amount of memory. In addition, once the VM has been launched, the VM management unit 202 may cause a connection to be automatically established between a client application of the client and the VM, such that a user can instantly access an application running within the VM without having to access and log onto a Web portal and to select a VM to be launched. Such a connection may be compatible with a variety of remote access protocols, such as, for example, SPICE (simple protocol for independent computing environment), RDP (remote desktop protocol), or VNC (virtual network computing) protocol.

The VM may be launched in another node (e.g., CBC or SBC node) or within the client. The VM may be launched substantially concurrently while the client is starting up, where the VM may be subsequently migrated back to the client via migration unit 204. Note that some or all of the components as shown in FIG. 2 may be implemented in software, hardware, or a combination of both.

Figure 3:
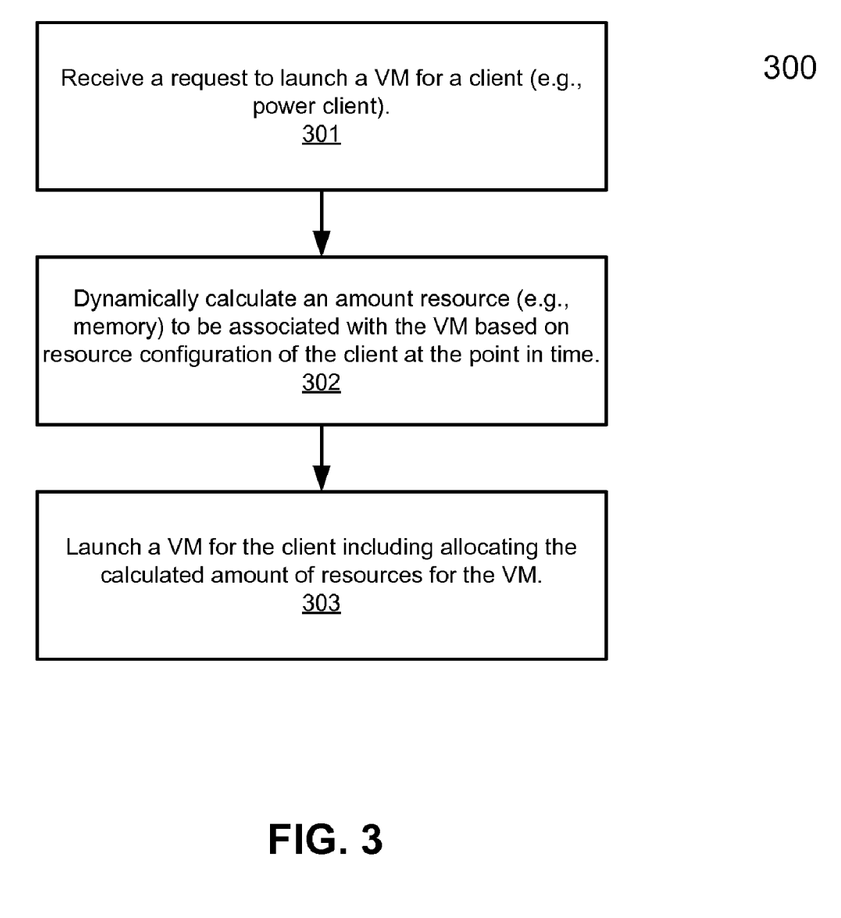
FIG. 3 is a flow diagram illustrating a method for automatically adjusting resources to be associated with a VM according to one embodiment.

FIG. 3 is a flow diagram illustrating a method for automatically adjusting resources to be associated with a VM according to one embodiment. Note that method 300 may be performed by processing logic which may include software, hardware, or a combination of both. For example, method 300 may be performed by controller 200 of FIG. 2. Referring to FIG. 3, at block 301, a request for launching a VM for a client is received. The request for launching a new VM may be received by automatically detecting that the client is starting up. Alternatively, the request is received in response to a user of the client to select (e.g., at a Web portal) a VM to be launched. At block 302, an amount of resources (e.g., memory) to be associated with the new VM is dynamically calculated based on resource configuration of the client at the point in time. At block 303, the new VM is launched with the calculated amount of resources. The new VM may be launched after the client has started up. Alternatively, the new VM may be launched at a remote node in parallel with the startup process of the client, and optionally the new VM is migrated back to the client subsequently.

Figure 4:
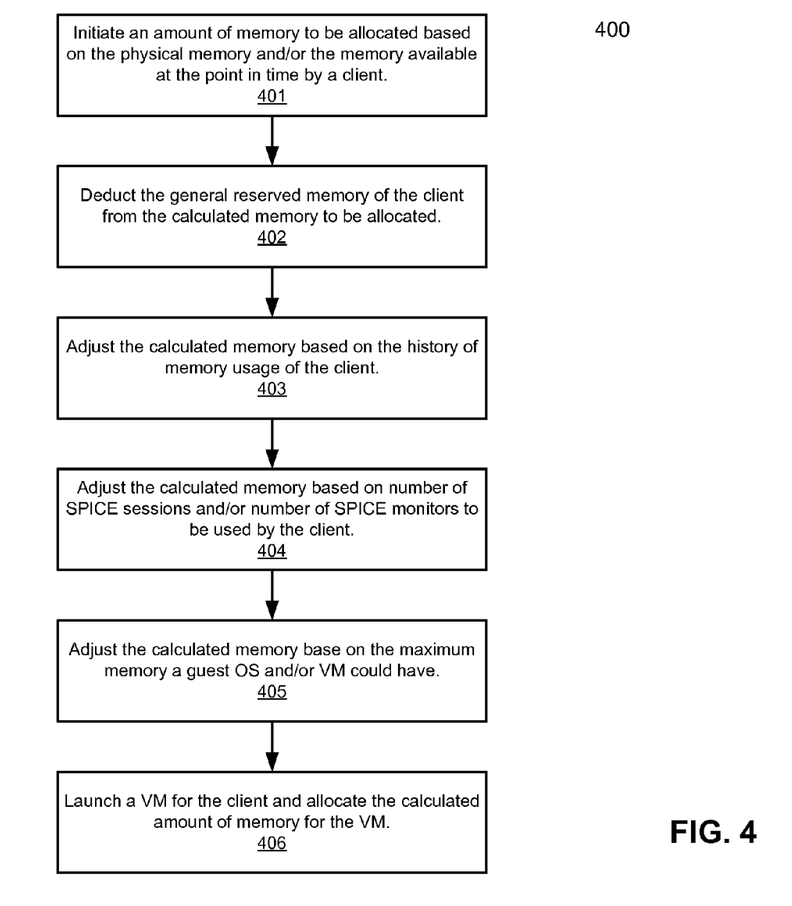
FIG. 4 is a flow diagram illustrating a method for automatically adjusting resources to be associated with a VM according to another embodiment.

FIG. 4 is a flow diagram illustrating a method for automatically adjusting resources to be associated with a VM according to another embodiment. Note that method 400 may be performed by processing logic which may include software, hardware, or a combination of both. For example, method 400 may be performed by controller 200 of FIG. 2. Referring to FIG. 4, in response to a request for launching a VM for a client (e.g., a power client), at block 401, processing logic initiates an amount of memory to be allocated for the new VM based on the physical memory or available memory of the client. For example, as described above, if the new VM is to be launched after the client has started; the allocated memory may be initialized based on the available memory of the client. If the new VM is to be launched in parallel while the client is starting up, the allocated memory may be initialized based on the physical memory of the client.

In one embodiment, a flag or attribute such as "BasedOnAvailableMemory", which may be stored in an entry of the configuration database associated with the client, is used to indicate whether the allocated memory is initialized based on the available memory vs. the physical memory. For example, when a client registers with a control server, based on whether a VM is launched after the client's startup process or in parallel, the flag of "BasedOnAvailableMemory" may also be configured.

At block 402, processing logic deducts an amount of general reserved memory associated with the client from the initial allocated memory. Such a general reserved memory may be specified and stored (e.g., as a parameter of "GeneralReserve") in an entry of the configuration database associated with the client, during the registration of the client.

At block 403, processing logic adjusts the allocated memory based on a history of memory usage of the client. As described above, a resource manager of the control server includes a resource monitor that periodically or constantly monitors the memory usage of a client over a period of time. Based on the history of memory usage of the client, the memory allocated to a new VM is adjusted, for example, not to be too large to cause memory swap (e.g., swapping content of the memory to a disk because of insufficient memory) at the client. That is, in this example, if too much memory is allocated to the new VM, the remaining memory available for the client is less, which may not be sufficient for the client without memory swap.

In this embodiment, the allocated memory for the new VM is adjusted downwardly to a level such that memory swaps are unlikely or less likely to happen based on the history of the memory usage. In one embodiment, the resource monitor may set a flag or attribute such as "SwapHistory" stored in an entry of the configuration database associated with the client, which indicates how many times and/or how much memory swaps happened over a past period of time. Thus, when processing logic calculates the amount of memory to be allocated for the new VM, based on the memory swap history, the allocated memory may be adjusted downwardly (e.g., deducting an average amount of memory swapped in the past).

Further, the history of memory usage of a client may include overall memory usage in the past. According to one embodiment, the allocated memory may further be adjusted based on a target memory usage threshold of the client in view of the overall memory usage in the past. When a client registers with a control server, an overall maximum percentage of available memory to be used by the client may be specified, for example, under an attribute of "OverallMemoryUtilization" stored in an entry of the configuration database associated with the client. For example, during the registration, if an administrator sets the parameter of "OverallMemoryUtilization" as 95%, while the history of the memory usage of the client indicates that the overall memory usage is around 97%, the available physical memory of the client may be deducted by 2% for the purpose of calculating the allocated memory for a new VM.

Referring back to FIG. 4, at block 404, the allocated memory may further be adjusted based on how many VMs and/or communications sessions coupled to VMs would be potentially utilized. In addition to hosting a local VM, a client may have one or more communications sessions (e.g., SPICE or RDP sessions) coupled to one or more VMs hosted remotely. Each communications session requires certain amount of memory to be associated with or reserved. In one embodiment, an amount of memory to be reserved for each session can be specified under an attribute such as "SpicePerSessionReserve" in an entry of the configuration database associated with the client.

In addition, the allocated memory may further be adjusted based on a number of monitors would be used in each VM. When a VM is configured, a maximum number of communications session monitors can be defined to be associated with the respective VM. However, a client may actually have more or fewer monitors to be utilized. Thus, according to one embodiment, the allocated memory may be adjusted by:

NumberOfVMs*min(NumberOfActualMonitors, NumberOfDefinedMonitorsInVM)

Referring back to FIG. 4, at block 405, the calculated memory is further adjusted based on a maximum memory that a particular type of the VM or a guest operating system hosted by the VM could have. For example, if a particular type of guest operating system can only handle up to 3 Giga Bytes (GB) of memory and the allocated memory is calculated to be more than 3 GB, the allocated memory is then adjusted downwardly to 3 GB. The maximum amount of memory that can be allocated to a particular VM or a guest operating system can be specified as a parameter such as "MaxMemory" in an entry of the configuration database associated with the client.

Furthermore, if the calculated allocated memory is below a minimum required memory defined for the VM, which may also be stored in the configuration database for the client, the defined minimum memory may be utilized for the allocated memory for the VM. In this case, the VM may be launched at a server node instead of at the client. At block 406, the VM is launched with the calculated allocated memory. Other operations may also be performed.

Figure 5:
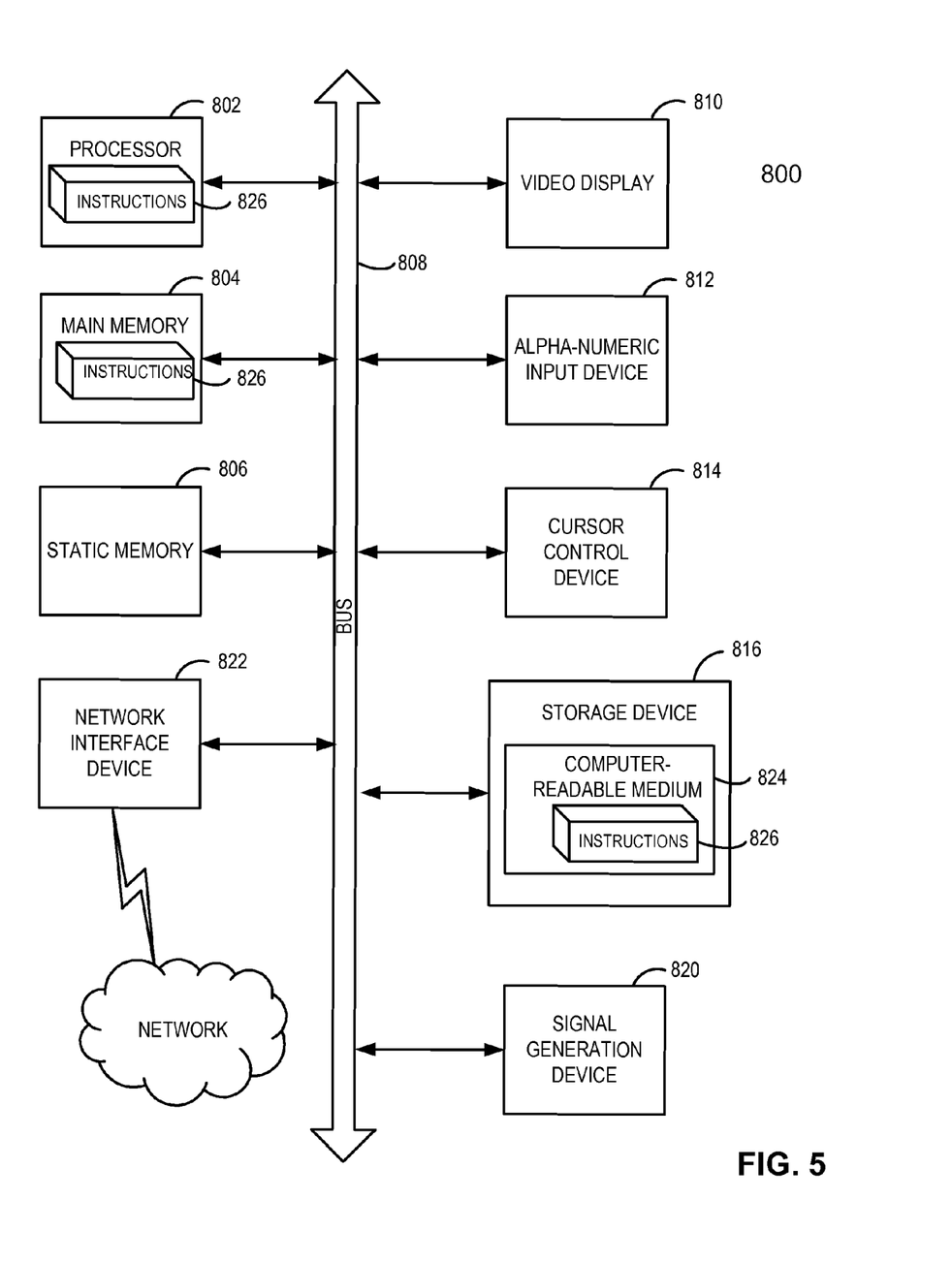
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software 826 embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network via the network interface device 822.

Thus, techniques for launching a VM with memory automatically adjusted in view a memory configuration of a client hosting the VM have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
receiving, by a control server computer system managing a plurality of virtual machines (VMs) over a network, a request to launch a VM of the plurality of VMs for a client;
determining, by the control server computer system, an amount of memory to be associated with the VM, the determining based on a memory configuration of the client when the request to launch the VM is received at the control server computer system; and
launching, by the control server computer system, the VM with the determined amount of memory allocated to the VM, wherein the VM is to be hosted by the client.

2. The method of claim 1, wherein determining an amount of memory in view of a memory configuration of a client comprises:
initiating the allocated memory based on physical memory of the client if the VM is launched in parallel with the client while the client is starting up;
initiating the allocated memory based on available memory of the client at the point in time if the VM is launched after the client has started up, wherein the available memory of the client is obtained dynamically by interrogating the client over the network; and
deducting an amount of general reserved memory of the client from the initiated allocated memory.

3. The method of claim 2, further comprising:
monitoring a history of memory usage of the client over a period of time including monitoring memory swap activities of the client; and
adjusting the allocated memory based on the history of memory usage of the client to reduce likelihood of further memory swap activities with respect to launching of the VM.

4. The method of claim 3, further comprising deducting from the allocated memory an average amount of memory swapped at the client during the period of time based on the history of memory usage of the client.

5. The method of claim 4, further comprising adjusting the physical memory or the available memory of the client based on an average percentage of overall memory utilization over the period of time in view of the history of memory usage of the client.

6. The method of claim 5, further comprising:
determining a number of communications sessions that the client potentially would establish to access corresponding VMs; and
deducting an amount of memory reserved for each communications sessions from the allocated memory.

7. The method of claim 6, further comprising deducting from the allocated memory an amount of memory reserved to be used with each of the VMs potentially used by the client.

8. The method of claim 6, wherein each of the communications sessions is compatible with one of a remote desktop protocol (RDP) and a simple protocol for independent client computing (SPICE).

9. A non-transitory computer readable storage medium including instructions that, when executed by a processing system, cause the processing system to perform a method, the method comprising:
receiving, by a control server computer system managing a plurality of virtual machines (VMs) over a network, a request to launch a VM of the plurality of VMs for a client;
determining, by the control server computer system, an amount of memory to be associated with the VM, the determining based on a memory configuration of the client when the request to launch the VM is received at the control server computer system; and
launching, by the control server computer system, the VM with the determined amount of memory allocated to the VM, wherein the VM is to be hosted by the client.

10. The non-transitory computer readable storage medium of claim 9, wherein determining an amount of memory in view of a memory configuration of a client comprises:
initiating the allocated memory based on physical memory of the client if the VM is launched in parallel with the client while the client is starting up;
initiating the allocated memory based on available memory of the client at the point in time if the VM is launched after the client has started up, wherein the available memory of the client is obtained dynamically by interrogating the client over the network; and
deducting an amount of general reserved memory of the client from the initiated allocated memory.

11. The non-transitory computer readable storage medium of claim 10, wherein the method further comprises:
monitoring a history of memory usage of the client over a period of time including monitoring memory swap activities of the client; and
adjusting the allocated memory based on the history of memory usage of the client to reduce likelihood of further memory swap activities with respect to launching of the VM.

12. The non-transitory computer readable storage medium of claim 11, wherein the method further comprises deducting from the allocated memory an average amount of memory swapped at the client during the period of time based on the history of memory usage of the client.

13. The non-transitory computer readable storage medium of claim 12, wherein the method further comprises adjusting the physical memory or the available memory of the client based on an average percentage of overall memory utilization over the period of time in view of the history of memory usage of the client.

14. The non-transitory computer readable storage medium of claim 13, wherein the method further comprises:
determining a number of communications sessions that the client potentially would establish to access corresponding VMs; and
deducting an amount of memory reserved for each communications sessions from the allocated memory.

15. The non-transitory computer readable storage medium of claim 14, wherein the method further comprises deducting from the allocated memory an amount of memory reserved to be used with each of the VMs potentially used by the client.

16. The non-transitory computer readable storage medium of claim 14, wherein each of the communications sessions is compatible with one of a remote desktop protocol (RDP) and a simple protocol for independent client computing (SPICE).

17. A system, comprising:
a memory;
a processing device communicably coupled to the memory;
a client detection unit executable from the memory by the processing device, the client detection unit configured to receive a request for launching a virtual machine (VM) for a client over a network, wherein the VM is one of a plurality of VMs managed by the system;
a resource manager coupled to the client detection unit and executable from the memory by the processing device, the resource manager configured to, in response to the request, determine an amount of memory to be associated with the VM, the determining based on a memory configuration of the client when the request to launch the VM is received at the client detection unit; and
a VM management unit coupled to the resource manager and executable from the memory by the processing device, the VM management unit configured to launch the VM with the determined amount of memory allocated to the VM, wherein the VM is to be hosted by the client.

18. The system of claim 17, wherein the resource manager is configured to
initiate the allocated memory based on physical memory of the client if the VM is launched in parallel with the client while the client is starting up,
initiate the allocated memory based on available memory of the client at the point in time if the VM is launched after the client has started up, wherein the available memory of the client is obtained dynamically by interrogating the client over the network, and
deduct an amount of general reserved memory of the client from the initiated allocated memory.

19. The system of claim 18, wherein the resource manager comprises a resource monitor to monitor a history of memory usage of the client over a period of time including monitoring memory swap activities of the client, and wherein the resource manager is configured to adjust the allocated memory based on the history of memory usage of the client to reduce likelihood of further memory swap activities with respect to launching of the VM.

20. The system of claim 19, wherein the resource manager is configured to deduct from the allocated memory an average amount of memory swapped at the client during the period of time based on the history of memory usage of the client.

* * * * *